United States Patent [19]
Cotton, Jr.

[11] 3,912,471
[45] Oct. 14, 1975

[54] HIGH VELOCITY MOISTURE ELIMINATOR
[75] Inventor: Worth Cotton, Jr., Greensboro, N.C.
[73] Assignee: Industrial Air, Inc., Greensboro, N.C.
[22] Filed: July 1, 1974
[21] Appl. No.: 484,550

[52] U.S. Cl. .................... 55/440; 55/443; 55/257; 55/464; 55/DIG. 37
[51] Int. Cl.² ........................................ B01D 45/00
[58] Field of Search ............ 55/440, 442, 443, 444, 55/464, 465, DIG. 37, 257; 98/121 R, 18

[56] References Cited
UNITED STATES PATENTS
2,643,736   6/1953   Smith ................................... 55/464
3,517,486   6/1970   Golden ................................. 55/440
FOREIGN PATENTS OR APPLICATIONS
906,644   9/1962   United Kingdom ................... 55/440

Primary Examiner—Frank W. Lutter
Assistant Examiner—David L. Lacey

[57] ABSTRACT

A plurality of moisture eliminator blades arranged in parallel relationship to each other and in the path of a gaseous stream wherein each blade is formed by a plurality of successive planar sections, each section forming an obtuse angle of approximately 150° with the preceding and succeeding sections to define a plurality of separating surfaces for the liquid droplets as they impinge on the blades. Each blade is further so formed, as far as the direction of said angles are concerned, in such a manner that in at least a portion of the blade, two successive planar separating surfaces occur on the same side of the same blade. A plurality of hooks, one at the downstream or trailing edge of each planar separating surface, extend along the vertical length of the blade, and approximately one-eighth of an inch into the air path to guide accumulated liquid droplets downward into a reservoir.

6 Claims, 3 Drawing Figures

HIGH VELOCITY MOISTURE ELIMINATOR

BACKGROUND OF THE INVENTION

Apparatus serving to eliminate moisture droplets from a gaseous stream are known to exist in the prior art and are known as "moisture eliminators." The function of such apparatus, especially as used in air conditioning systems, is to direct a water treated gaseous stream through a series of blades or partitions arranged parallel to each other. The blades are of such a configuration that the fluid droplets are repeatedly impinged against the planar surfaces of the blades causing the water to separate from the air. The droplets are then collected by hooks along the trailing edge of each collection surface and fall by gravity into a reservoir below. It is desired that these eliminator blades be geometrically designed to permit the gaseous stream to flow through at a high velocity, i.e. up to and exceeding 1500 feet per minute (fpm), with a maximum removal of liquid particles from the stream and a minimum pressure drop. In conventional eliminators with high velocity air streams a problem exists in removing high percentages of moisture droplets without an attendant high pressure drop which is undesirable.

Eliminator blades in prior art are generally so constructed as to effect a zigzag movement of the gaseous stream wherein the stream impinges first on one blade, then on the adjacent blade. This back and forth movement, impinging on multiple blades, has proven efficient in removing liquid particles from the gaseous stream, but the back and forth movement of the air increases pressure drop and is not compatible with operation at high velocities of approximately 1500 fpm.

As industrial technology has advanced, there has evolved an increasing demand for eliminators which operate at such high velocities, with a high efficiency level, and minimum pressure drop.

There are existing devices known to operate at a high velocity, which have high efficiency and high pressure drops, or which minimize pressure drop with an attendant loss of efficiency. However, none of the existing devices has achieved the combination of high efficiency with minimum pressure drop. Efficiency as used herein refers to the percentage of water droplets and fog removed in the eliminator, which cause "carry-over" if they pass through the eliminator.

U.S. Pat. No. 3,338,035 issued to Dinkelacker Aug. 29, 1967 discloses a plurality of spaced identical partition wall members with arcuate portions defining a turning zone for the gas stream and a series of secondary ripples on said partition walls, the peaks and valleys of said ripples on said partition walls, the peaks and valleys of said ripples forming draining channels for accumulated moisture droplets. The Dinkelacker apparatus has been successful in that it does operate at a high velocity, with minimal pressure drop. However, because of the few impingement surfaces provided by the arcuate configuration, the absence of hooks, and the relatively straight air flow path, it has a relatively low efficiency level and carry-over of liquid droplets into the conditioned area has been noticed.

Another commercially available eliminator includes partitions having an arcuate portion forming the impingement surfaces with a hook protruding outwardly from the arcuate portion and extending approximately one-half of the distance between the two partition walls into the path of the stream to serve as a drainage channel for accumulated fluids. While the arcuate portion with the protruding hooks is relatively efficient, the aforementioned hook causes a significant pressure drop which has been found to reach a level of more than 1.0 inch of $H_2O$ at a velocity of 1500 fpm.

SUMMARY OF THE INVENTION

The present invention is directed to a moisture eliminator which operates at approximately 1500 fpm or more with a capacity to remove more than 99.9% of the liquid droplets from a gaseous stream and with a pressure drop of not more than 0.5 inches of $H_2O$. A plurality of eliminator blades are arranged approximately 1 ⅛ inches apart in parallel relationship to each other and the path of the gaseous stream. Each blade includes at least five successive planar separation surfaces or sections, each section forming an obtuse angle of approximately 150° with the preceding and succeeding sections to define multiple separation surfaces for the liquid droplets as they impinge on the blades. It has been found that such angles permit minimum resistance to the flow of a gas stream, yet exhibit high efficiency. A plurality of hooks located at the trailing edge of each planar separation surface extend approximately ⅛ inch into the path of the stream to channel accumulated droplets to the reservoir, but do not extend to a depth that deleteriously impedes the flow of the stream to cause an undesirably high pressure drop.

Another and important feature of the present invention lies in the arrangement of the planar separation surfaces so that the air does not alternately strike one blade then the other as in previously known apparatus. Rather, in the eliminator of the present invention the design of the blade and the direction of the bends therein is such that at selected points the air impinges two successive separation surfaces on the same blade without the zigzag effect. It is felt that this feature aids in minimizing the pressure drop characteristic of this eliminator.

The present invention has as its primary objective the maximum elimination of moisture droplets from a high velocity gaseous stream with minimum pressure drop.

A further object of the invention is to prevent carry-over of liquid droplets into the conditioned area.

Specific details of the preferred embodiment of the present invention and the method of operation will be more clearly apparent by a reading of the following specification in conjunction with the following drawings in which.

DETAILED DESCRIPTION OF PREFERRED EMBODIMENTS

Figure 1:
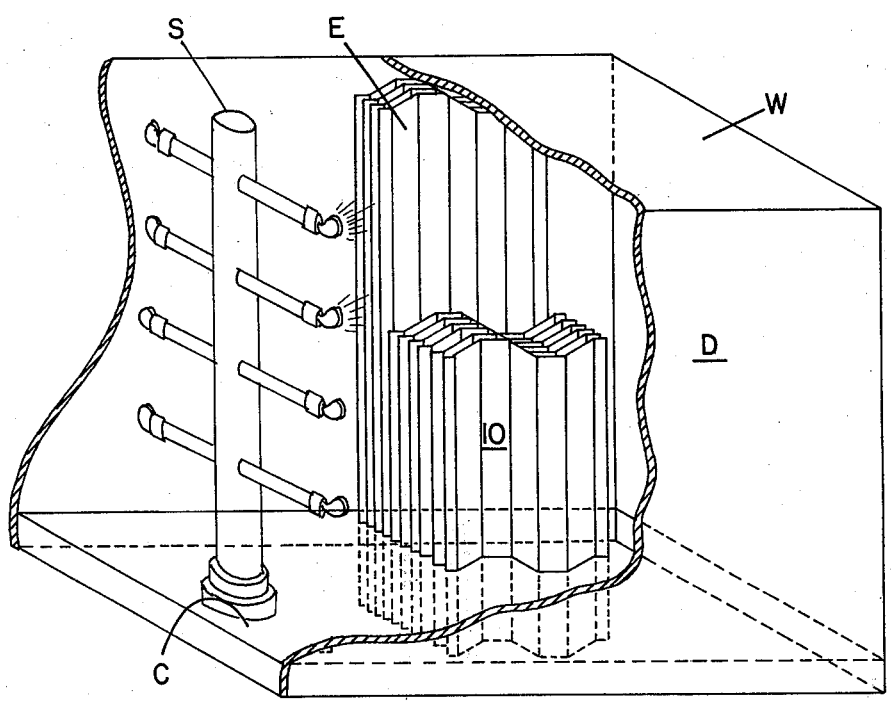
FIG. 1 is an environmental perspective view of a complete air washer or scrubber system according to the present invention, with the exterior sidewalls broken away to more clearly reveal the eliminator blades.

Turning now to the drawings, and particularly to FIG. 1, the present invention is directed to moisture eliminators for air washers or scrubbers W. In general, the air washer is enclosed in a duct D and includes a spray unit S past which a gaseous stream is conducted. Much of the water will be absorbed into the gaseous stream, however, excess water will remain therein in the form of water droplets or fog. It is necessary to remove such water droplets and fog prior to leaving the washer section W. In this regard, a moisture eliminator E is placed in the path of the gaseous stream and comprises a plurality of vertically oriented eliminator blades 10 arranged in parallel relationship with each other in the path of the gaseous stream.

The instant invention lies in the configuration of these blades 10, and in general each blade includes a plurality of successive planar sections 12, 14, 16, 18 and 20. Each of the aforementioned planar sections is arranged at an obtuse angle *a*, *b*, *c*, *d*, with respect to the adjacent planar sections to define a plurality of moisture separating surfaces 28, 34, 36, 38, 40. The aforementioned obtuse angles are the included angle between adjacent planar sections. Rather than said included angle being directed first in one direction and then in the opposite direction to cause a zigzag air path as in prior art devices, the angles are directed in the same direction at two successive intersections, then are directed in the opposite direction for two successive turns so that at least two successive planar separation surfaces 34,36 and 38,40 following the first separation surface 28 occur on the same side of the blades throughout at least a portion of the extent of each blade.

Further, a hook 22 extends vertically along the trailing edge of each of said separation surfaces to guide accumulated moisture droplets to a collection area C below the eliminator apparatus.

Figure 2:
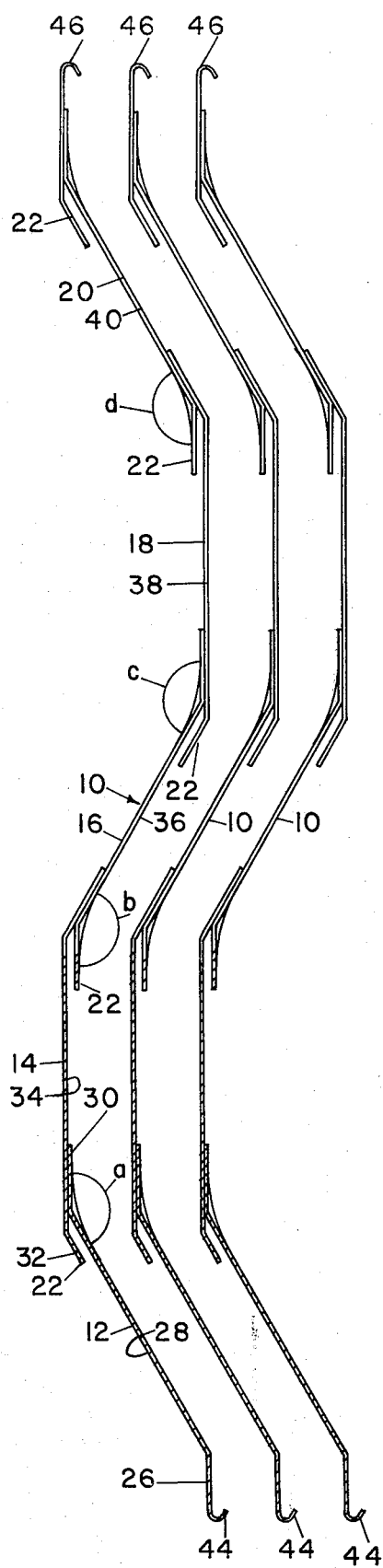
FIG. 2 is a plan view of several adjacent eliminator blades according to one embodiment of the present invention.

As illustrated in FIG. 2, in one embodiment each blade 10 may be formed by securing together a plurality of sections 12, 14, 16, 18 and 20. For example, section 12 includes a leading or upstream flange 26, a planar central or separation surface 28 on the left-hand side of section 12, and a trailing flange 30. Trailing flange 30 is bent at an angle of approximately 150° from the planar separating surface 28 and is secured to the corresponding separation surface 34 of the next planar section 14 in such a manner as to be coextensive therewith. The second planar section 14 includes an angularly extending, forwardly protruding flange 32 which is parallel to and spaced slightly from the adjacent separation surface of planar section 12 to form hook 22 at the trailing edge thereof as explained hereinabove. The remainder of blade 10 is formed similarly to the procedure set forth hereinabove.

It should be noted that the included angle *b* between planar section 14 and 16 is on the same side of blade 10 as the included angle *a* between sections 12 and 14. On the other hand, the included angle *c* between planar sections 16 and 18 and included angle *d* between sections 18 and 20 are both on the opposite side of blade 10 from angles *a*, *b*, so that at least two successive planar separation surfaces 34, 36 occur on the same side (right-hand) of blade 10 with the following two successive separation surfaces 38, 40 occurring on the opposite (or left-hand side of blade 10 from separation surfaces 34, 36.

It is important to note that in high velocity eleminators, as contrasted with low velocity eliminators, substantially all of the separation of water and air occurs on the planar separating surfaces, not in the hooks 22. The air path takes a smoother sinuous path through high velocity eliminators. Centrifugal force created by the high speed curved air path flings the heavier water droplets against the planar separating surfaces while the air path is more easily directed resulting in the separation.

It is also important in the construction of the eliminator blade according to the present invention that, because separation is effected by the planar sections or surfaces rather than the hooks, each blade should contain at least five separation surfaces, so the gaseous stream is subjected to a sufficient number of impingements to attain a desirably high water droplet removal efficiency and thereby eliminate any possibility of carry-over. The blades in the eliminator are positioned approximately 1 ⅛ inches apart and the hooks 22 at the end of each separation surface extend outwardly into the gaseous stream approximately ⅛ inch. Each planar separation surface is approximately 4 ⅛ inches long. At the extremities of each blade 10, a supporting member 44,46 is provided whereby the blades may be mounted in a conventional manner within the washer section W and removed for cleaning, repair and replacement.

Figure 3:
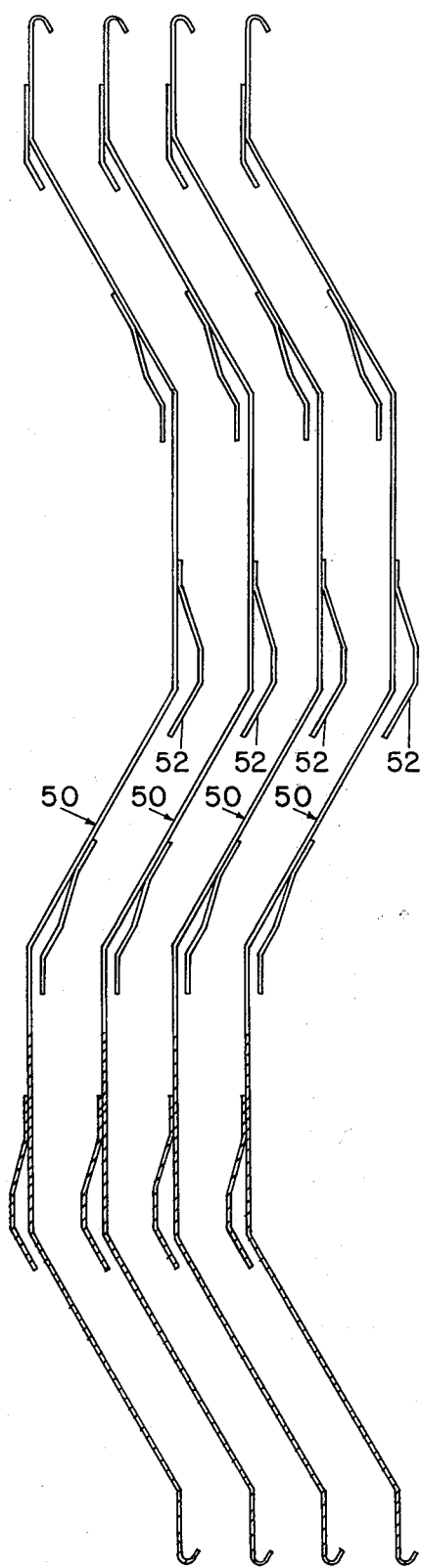
FIG. 3 is a plan view similar to FIG. 2 except illustrating an alternate embodiment of the blades.

FIG. 3 is illustrative of an alternate embodiment whereby each blade 50 is formed from a single planar sheet of material and bent into the configuration described hereinabove for FIG. 2. The hooks 52 are welded or spot-welded into the proper position at the end of each separation surface. There is no difference in the function of the eliminator shown in FIG. 3 from that shown in FIG. 2, only a difference in the way the individual blades are manufactured.

The geometry of the blade configuration, and especially such features as the change to the non-zigzagpath along with the obtuse angle between separation surfaces, the spacing between blades, and the minimal hook protuberance into the gaseous stream provides a high velocity eliminator that efficiently removes moisture droplets while minimizing the attendant pressure drop. Such as construction provides an eliminator in which no carry-over has been evidenced, and in which the pressure drop through the eliminator section is on the order of 0.5 inches of $H_2O$ or less at 1500 fpm.

It is apparent that various changes and modifications may be made to the embodiment described hereinabove without departing from the scope of the invention which is set forth in the following claims.

What is claimed is:

1. An apparatus for eliminating moisture droplets from a high velocity gaseous stream comprising:
   a. a plurality of vertically extending eliminator blades arranged in parallel relationship with each other in the path of said gaseous stream;
   b. each of said blades including a plurality of successive planar sections having a separation surface on one side thereof and a trailing edge on the downstream edge of said separation surface, each of said planar sections being arranged at an obtuse angle with respect to the adjacent planar sections;
   c. said obtuse angles being so directed that at least two successive planar sections have the separation surface thereof on the same side of said blade;
   d. a hook extending along the trailing edge of each said planar sections to guide accumulated moisture droplets to a collection area below said apparatus and;
   e. said planar sections being of such a length that said gaseous stream impinges thereon at a point substantially upstream of said hook extending along the trailing edge of each of said planar sections, whereby separation occurs at the upstream portion of said planar sections, rather than at or adjacent said hooks.

2. The apparatus according to claim 1 wherein said obtuse angles are approximately 150°.

3. The apparatus according to claim 1 wherein said blades are spaced apart approximately 1⅛ inches and said hooks extend outwardly into the space between adjacent blades approximately ⅛ inch.

4. In a high velocity moisture eliminator of the type having a plurality of parallel, vertically arranged blades positioned in a gaseous stream, the improvement wherein each blade comprises a plurality of planar sections having a separation surface on one side thereof and a trailing edge extending along the downstream edge of said separation surface, each of said planar sections being arranged at an obtuse angle with respect to adjacent planar sections to define a plurality of successive separation surfaces, throughout at least a portion of said blade there being at least two successive planar sections in which the separation surfaces thereof occur on the same side of said blade followed by at least two successive planar sections in which the separation surfaces thereof occur on the other side of said blade, a hook extending along the trailing edge of each of said collection surfaces, and said planar sections being of such length that said gaseous stream impinges thereon at a point substantially upstream of said hook extending along the trailing edge of each of said planar sections, whereby separation occurs at the upstream portion of said planar sections, rather than at or adjacent said hooks.

5. The improvement according to claim 4 wherein said obtuse angle is approximately 150°.

6. The improvement according to claim 4 wherein said hooks extend outwardly from said collection surfaces approximately ⅛ inch.

* * * * *